J. Case.
Corn Planter.
Nº 18,730.
Patented Dec. 1, 1857.
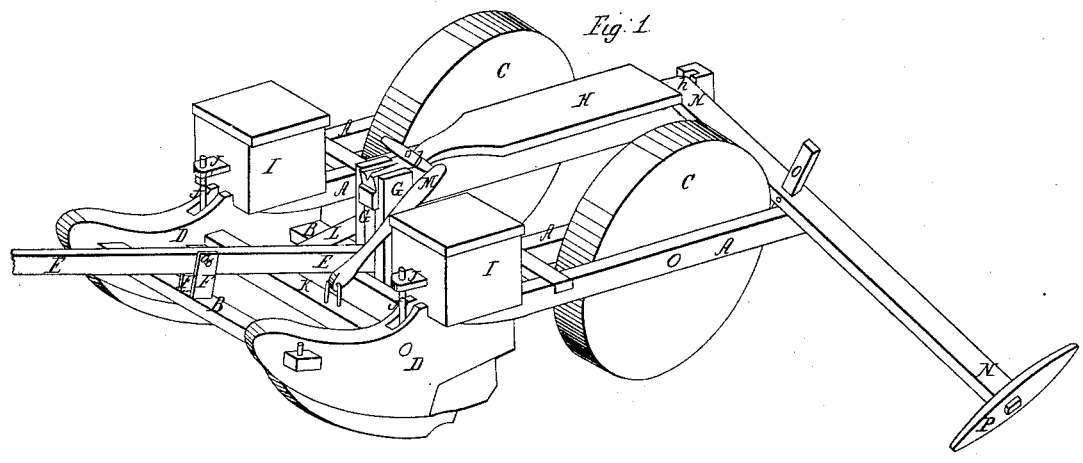
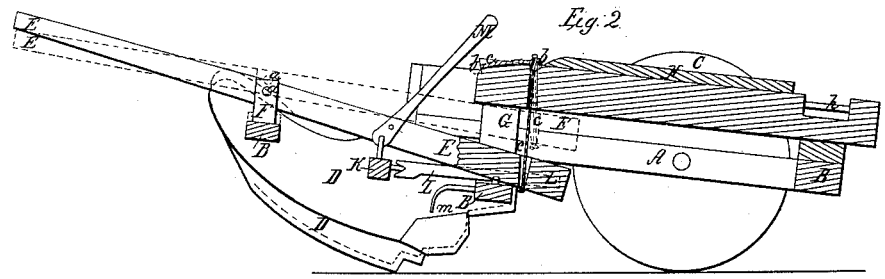
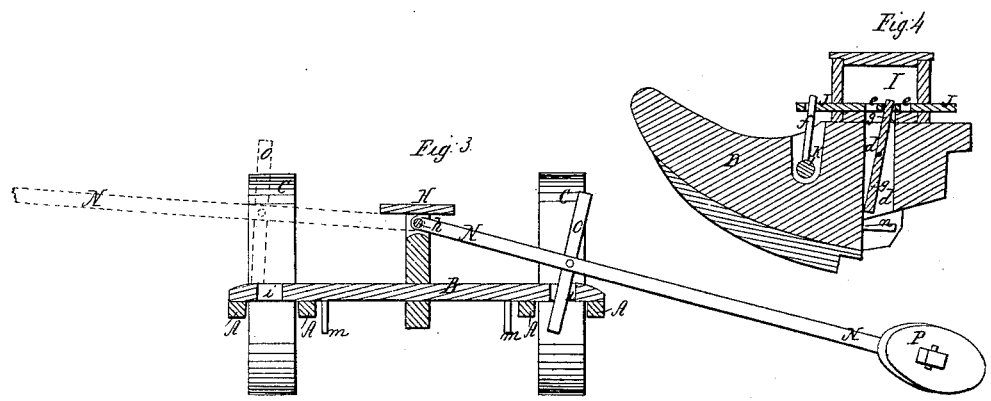

UNITED STATES PATENT OFFICE.

JARVIS CASE, OF SPRINGFIELD, ILLINOIS.

IMPROVEMENT IN SEEDING-MACHINES.

Specification forming part of Letters Patent No. 18,730, dated December 1, 1857.

*To all whom it may concern:*

Be it known that I, JARVIS CASE, of Springfield, in the county of Sangamon and State of Illinois, have invented certain new and useful Improvements in Machines for Planting Corn; and I do hereby declare the following to be a full, clear, and exact description of the construction and operation of the same, reference being had to the accompanying drawings, in which—

Figure 1 represents a perspective view. Fig. 2 represents a longitudinal section; Fig. 3, a transverse section, and Fig. 4 a section through one runner.

My invention relates more especially to the marker for laying off the furrows, by which the machine is guided in its path, it being so constructed as that the driver of the machine, who is also its operator, may, from his seat on the machine, reverse or turn over from side to side said marker or suspend it to the frame, to enable the machine to turn around at pleasure, or as circumstances may require.

To enable others skilled in the art to make and use my invention, I will proceed to describe the same with reference to the drawings.

A represents the longitudinal pieces, and B the transverse pieces, of the frame of the machine.

C C are a pair of supporting-wheels arranged in the after part of the frame. To the front of the frame are attached the two runners or shares D D, upon which the front part of the frame is supported.

E is the tongue of the machine, by which it is guided. This tongue is pivoted at $a$ to the uprights F F, which are attached to the front cross-bar, B. The rear of the tongue plays between the guides G G, connected to the cross-beam B, which extends from one runner to the other, at the rear of said runners.

H is the driver's seat, the driver being also the conductor or operator of the machine.

A cord, $c$, is connected to the rear of the tongue E, which cord passes up and is attached to a hand-pin, $b$, that rests or lies in a notch cut at the forward end of the seat, and so as to be easily handled by the driver. When the pin $b$ is thus lying in its notch, as shown in black in Figs. 1 and 2, then the runners or shares are let down onto the ground; but when the pin $b$ is raised up and carried forward and placed in a notch or recess in the end of the seat or its frame, as shown in red in Fig. 2, then the runners or shares are raised up out of the ground, as shown by the red lines in said Fig. 2, the tongue E, which serves as the lever to so raise and hold up the runners, assuming the position shown in red lines also in said figure. When the runners are to be raised up for the purpose of allowing the machine to be turned around, the driver, who is the operator, steps upon the ground or supports his weight on the ground by his legs, and then, by catching the pin $b$ and placing it as shown in red lines, Fig. 2, the runners are raised up and suspended on or by the rear of the tongue. When the machine has been turned around and is ready to advance the pin is removed to its notch on top of the frame or seat, as in Fig. 1, and the runners are then down to open out and hold open the furrows for the grain to drop into. These runners or shares have been found to be the very best contrivances for corn-planting machines; but it is indispensable to their usefulness that they can be raised up out of the ground to enable the machine to turn around at the ends of the furrows or rows.

I I are the seed-hoppers. They are placed over the rear portions of the runners or shares D D, respectively.

J J are seed-slides working through the hoppers I I. The slides have openings or cells $e\ e$ in them, which alternately receive and discharge their quota of grain through the opening $d$, from whence it falls, as will be hereinafter described, to the ground.

K is a pivoted bar, to which a treadle, L, is hinged, said treadle being also hinged to the cross-beam B near the rear of the runners. Said treadle extends back of the cross-beam B, so that the driver may place his foot upon it, and so that by first pressing with his toes and then with his heel, which gives two rocking motions to the shaft or bar K. To the journals of the bar K are connected respectively rods $f f$, which project upward through the runners or shares, their upper ends passing one into each one of the seed-slides J J, and thus the rocking motion of the bar K communicates a reciprocating motion to said seed-slides.

To the seed-slides is connected the upper end of a pivoted bar, $g$, hung in the opening $d$, leading from the seed-hopper to the furrow, and as the seed-slides are worked so they in turn vibrate their respective bars g. The object of these bars g is to catch and hold the charges of grain near their point of delivery, so that when the seed-duct is clear they will have but a very short distance to drop, and thus not be affected to any injurious extent by the forward motion of the machine or make false dropping. Brushes can be applied in the usual manner in the inside of the hoppers to sweep back any excess of grain that the cells may be carrying to the exit-opening.

I have represented a hand-lever, M, as connected to the bar K, so as to operate the seeding apparatus by hand, if so preferred; but I deem the hinged lever or treadle L the best.

In rear of the driver's seat there is hinged an arm, N, so that it can be turned over from one side of the machine to the other by the driver on his seat. This arm N is hinged at the point h, and in said arm is hinged a brace, O, so as to have some play in the mortise through which it passes. The object of the brace O is twofold, viz: It will, when placed as shown by the red lines in Fig. 3, hold up said arm N, and the marker P on its outer end, so that the machine can be readily turned around, and this placing of the brace in such position is done by the driver without leaving his seat H, which is a very important feature in the invention, and when the machine is turned around the driver then pushes out a little farther the top of the brace O, and its bottom part drops into a mortise, i, cut through the rearmost cross-piece, B, and when in this position, as shown by the black lines in Fig. 3, it serves to let the marker P drop onto the ground, and then acts as to keep said arm and marker steady, while it allows them to rise and yield to any intervening obstacle. Whenever the machine is turned around the marker P must be turned over to the opposite side of the machine; but it must not drop clear down until the machine is turned, though it must be raised up before the turning is commenced. It will thus be seen that to allow the driver to do these things from his seat while he drives his horses the brace O performs no small assistance in the matter. It holds up the arm and marker, steadies and strengthens it when down, and allows it to rise and fall in passing clods or any other obstructions without endangering the marker. The marker P is placed oblique to the arm N, so that it may be light and still make a mark on the ground wide enough to be distinctly seen on the return-furrows of the machine.

m m are indices to show when the seed-ducts are exactly over the point where the seeds are to be dropped, so that the driver from his seat can tell where the exact point is, for he can plainly see the indices m, but not the seed-ducts, which are not visible.

A pin, n, is placed in the lower end or part of the seed-duct to act as a spreader to the dropping grains to prevent them from falling upon each other.

The distance from the marker P to the line of the seed-duct nearest to it should be the same as the distance between the pairs of seed-ducts themselves, so that one of the runners shall always run in the line marked out by the marker and keep the rows uniformly spaced; and the hinged end of the arm N should be mounted high enough to prevent the outer rails of the machine, as it is rocked by passing over the ground, from coming in contact with said rail, which would raise up the marker and prevent its action.

When the marker is thrown over to the "nigh side" of the machine, as shown in Fig. 1, the driver puts the nigh runner into the mark or line made by the previous round of the machine, the horse on the nigh side also walking in that line or furrow. He carefully watches the index m on that side, and whenever the said index comes over the previously laid-out rows he operates his foot or hand lever and the dropping of the grain is effected. After the machine arrives at the end of the row and is turned around the marker is thrown to the opposite or "off side," as in Fig. 3, and he then directs his attention to the off horse, runner, and index, and so changes every time the machine is turned around. The ground to be planted, if in check-rows, is first laid off in one direction into parallel rows by this or any other machine, and the cross-rows are made by means of the marker while planting the corn. When the corn is drilled in the first laying off is unnecessary. All the necessary changes and operations of the machine are effected by the driver, who is the sole operator of the machine, without leaving his seat.

Having thus fully described the nature and object of my invention, what I claim therein as new, and desire to secure by Letters Patent, is—

So combining with the driver's seat H a marker having in its arm a hinged brace, or its equivalent, as that said driver may from his seat turn over or reverse said marker, suspend it to the machine while turning around, and drop it into its working position without leaving his seat on the machine, as herein set forth, and for the purposes explained.

JARVIS CASE.

Witnesses:
A. B. STOUGHTON,
THOS. H. UPPERMAN.